United States Patent [19]

Giraudy

[11] Patent Number: 5,459,472
[45] Date of Patent: Oct. 17, 1995

[54] DEVICE FOR DISPLAYING AT LEAST ONE IMAGE DELIVERED IN PARTICULAR BY A RADAR

[75] Inventor: Bernard C. Giraudy, Taverny, France

[73] Assignee: Sopelem-Sofretec, Bezons, France

[21] Appl. No.: 50,883

[22] Filed: Apr. 21, 1993

[30]    Foreign Application Priority Data

Jun. 18, 1992 [FR]  France .................................. 92 07422

[51] Int. Cl.6 ................................. G01S 7/04; G01S 7/22
[52] U.S. Cl. ........................... 342/176; 342/182; 342/185
[58] Field of Search ................................... 342/176, 185, 342/182

[56]    References Cited

U.S. PATENT DOCUMENTS

| | | | |
|---|---|---|---|
| 3,904,817 | 9/1975 | Hoffman et al. .......................... | 342/185 |
| 4,580,164 | 4/1986 | Andrieu et al. ...................... | 342/185 X |
| 4,660,043 | 4/1987 | Lachaize et al. ........................ | 342/185 |
| 4,829,308 | 5/1989 | Tol et al. .................................. | 342/185 |

Primary Examiner—Gilberto Barrón, Jr.
Attorney, Agent, or Firm—Martin Smolowitz

[57]    ABSTRACT

A device for displaying an image delivered in particular by a radar on a screen of a television monitor associated with a videographic memory the contents of which are controlled by a control assembly for the control of the display and reception of the image to be displayed, the control assembly functions in conjunction with an after glow processor for processing the contents of certain zones of the videographic memory in accordance with a given law a mathematical treatment formula for producing a pseudo-after glow phenomenon of certain points of the radar image displayed on the screen.

7 Claims, 2 Drawing Sheets

5,459,472

DEVICE FOR DISPLAYING AT LEAST ONE IMAGE DELIVERED IN PARTICULAR BY A RADAR

BACKGROUND OF THE INVENTION

The present invention relates to a device for displaying an image delivered in particular by a radar on a screen of a television monitor.

More particularly, a television monitor screen is associated with a videographic memory the contents of which are controlled by a control means for controlling the display, receiving the image to be displayed.

More generally, the display device of the invention permits display on a standard television screen having an X, Y scanning, i.e. in Cartesian coordinates, images coming from a sensor operating in ρ, θ, i.e. in polar coordinates.

This sensor is usually a radar antenna and its associated control electronics. As is known, in the art, the consoles employed for the display of the radar images directly receive different data and in particular, the output videographic signal of the radar.

However, these consoles are relatively rudimentary and the quality of the image displayed is not very good.

Furthermore, the possibilities of extending the use of radar image display is relatively limited by the structure of these consoles, and in particular by the display screen and its control electronics.

SUMMARY OF THE INVENTION

It is therefore an object of the invention to overcome these problems by permitting the display of these images on a television screen while maintaining the ergonomics of the conventional consoles and preserving the quality of the image related to the phosphors after glow in conventional consoles.

The invention therefore has as its objective a device for the display of a radar image on a screen of a television monitor which is, associated with a videographic memory. The contents of the memory are controlled by control means which receives the image to be displayed. The control means functions in conjunction with an after glow processor for processing the content of certain zones of the videographic memory in accordance with a given law, a mathematical treatment formula, to produce a pseudo-after glow phenomenon of certain points of the radar image displayed on the screen.

A converter is advantageously interposed between the radar and the control means, for converting the standard of the data contained in a videographic signal delivered by the radar, from a polar coordinates system into a Cartesian coordinates system.

The invention will be better understood from the following description which is given solely by way of example with reference to the accompanying drawings.

DESCRIPTION OF THE PREFERRED EMBODIMENT

Figure 1:
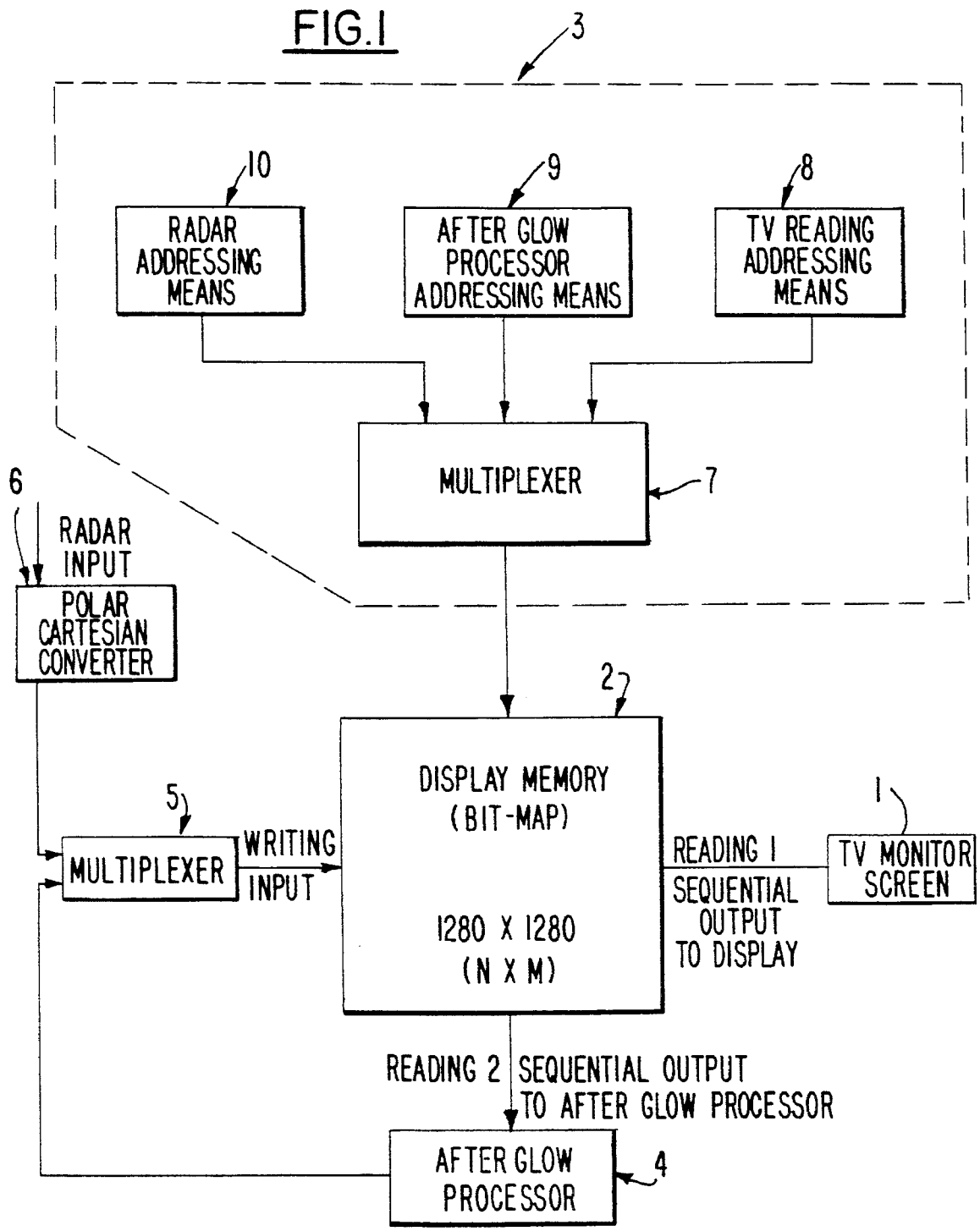
FIG. 1 is a block diagram illustrating the operation of a display device according to the invention.

As can be seen in FIG. 1, a display device according to the invention permits the display of an image delivered by a radar on a screen 1 of a television monitor associated with a videographic memory 2. The contents of the memory are controlled by control means 3, which control display and receiving of the image to be displayed.

These control means 3, are conventional and known in the art, as from for example, U.S. Pat. No. 4,580,164 and includes: television reading addressing means 8, after glow processor addressing means 9, radar addressing means 10 and multiplexer 7.

According to the invention, the control means 3 functions in conjunction with after glow processor 4 which permits the processing of the content of certain zones of the videographic memory 2 in accordance with a given law, a mathematical treatment formula, as is known from, for example, U.S. Pat. No. 4,580,164, so as to produce a pseudo-after glow phenomenon of certain points of the radar image displayed on the screen.

In fact, the after glow processor 4 was designed to solve the general problem of the presentation of a radar image on a black and white or colour television monitor.

The latter accomplishes for example, a progressive clearing of the contents of the memory to permit display, for each radar scanning, of the situation in real time, and the conventional display of a radar image closely related to the phosphors after glow in cathode ray tubes of conventional radar consoles.

The observation of the visual phenomena due to the asynchronism of the two types of scanning, namely the radar scanning and the television scanning, together with the physiology of the human eye, permits the development of a simple and high-performance algorithm, such as is known for example, from U.S. Pat. No. 4,829,308 providing an excellent rendering of the after glow effect.

Access to the videographic memory 2 in the Cartesian coordinate system is accomplished in accordance with the following principles:

in writing by the radar input through multiplexer 5 and polar to cartesian converter 6 for converting the standard of the data contained in the videographic signal delivered by the radar, from a polar coordinates system to a Cartesian coordinates system of a conventional type. This cycle corresponds to one reading cycle with rewriting in the memory 2 of the old value of the latter, if this value is greater than the amplitude of the radar data. In the opposite case, the data from the radar is written in the memory 2.

In writing by the after glow processor 4, which corresponds to one cycle of reading and rewriting of the data with a decrease in accordance with a law, a mathematical treatment formula, which is programmable by linear or exponential functions.

In reading by the TV output, which corresponds to one cycle of the sequential reading of the stored data for display of the image on the screen.

It will therefore be understood that the device according to the invention, permits by suitable processing of data from the radar, in particular, as concerns the videographic memory 2 associated with the screen 1 of a television monitor, ensuring the display of radar images on the television monitor, while preserving the quality of the image, related to the phosphors after glow employed in conventional consoles of PPI (Panoramic Plot Indicator) type.

The fact that this phosphors after glow effect is obtained in a controlled manner in the videographic memory 2 of the monitor, permits any laws of decrease of the luminosity both on the spatial plane, and the time plane up to an infinite after glow for effecting the trace of the history of the trajectories of moving targets.

In practice, the after glow may be established between three seconds and infinity.

The remanence processor 4 may be constructed by means of discrete components or in a programmed form. The television monitor may be formed of a high-definition monitor.

Figure 2:
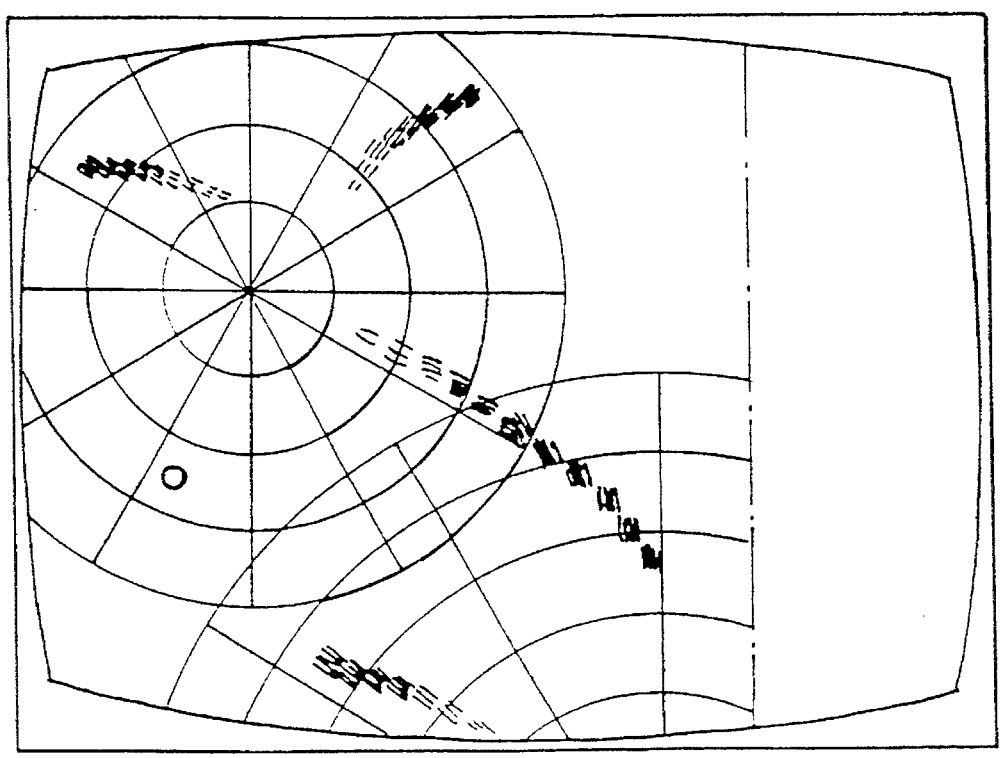
FIG. 2 represents a screen of a monitor on which two radar images are displayed simultaneously.

As shown in FIG. 2, invention also permits the simultaneous display on the same monitor of a plurality of radar images which are complete or partial. The radars are located at a distance from one another.

As shown in FIG. 2, the simultaneous display of two radar images permits for example, one to follow, without discontinuity, the trajectory of an aircraft, or a missile, which flies in succession into the field of the two radars.

It is possible according to the invention, to envisage the simultaneous display of four radar images with the aid of a single videographic memory.

What is claimed is:

1. In a device for display of an image transmitted by radar to a screen of a television monitor, said television monitor being connected to videographic memory means for receiving and storing radar signals; control means connected to said videographic memory means for controlling the contents of said videographic memory means, wherein said device further comprises:

polar to cartesian converter means; said converter means being connected to said videographic memory means through multiplexer circuit means, to receive input from said converter means for accessing converted radar signals to said videographic memory means; and an asynchronous after glow processor means; said after glow processor means being connected to said videographic memory means through said multiplexer circuit means; said after glow processor means being adapted to receive output from said videographic memory means to produce an observable pseudo after glow phenomenon, in response to a mathematical treatment formula of programmable mathematical functions applied to certain points of said radar image displayed on said television monitor screen, whereby, processing of said pseudo after glow of said certain points of said radar image display is independent of radar sweep speed.

2. A device as claimed in claim 1, for converting of said radar signal and in writing to said video memory means, wherein: said converter means receives radar output video signals in polar coordinates for conversion into cartesian coordinates and delivers converted output coordinates through said multiplexer means in the form of written output to said video memory means.

3. A device as claimed in claim 1, for at least one access and in writing to said video memory means, wherein: said after glow processor means is operational in response to a mathematical treatment formula of programmable mathematical linear functions for one cycle of reading and rewriting of data in decreasing manner.

4. A device as claimed in claim 1, for at least one access and in writing to said video memory means, wherein: said after glow processor means is operational in response to a mathematical treatment formula of programmable mathematical exponential functions for one cycle of reading and rewriting of data in decreasing manner.

5. A device as claimed in claim 1, wherein: said after glow processor means is adapted to progressively clear contents in said videographic memory means.

6. A device as claimed in claim 1, wherein: said control means connected to said videographic memory means includes:

address multiplexer means to provide addresses to said videographic memory means for writing output from said after glow processor means and for reading addresses in said videographic memory means for transmission to said T.V. monitor screen.

7. A device as claimed in claim 1, wherein: said multiplexer circuit means are adapted to permit alternate writing, in a first instance, of radar output data to said videographic memory and in a second instance, of data from said afterglow processor means.

* * * * *